United States Patent [19]

Kawaguchi

[11] Patent Number: 4,864,211
[45] Date of Patent: Sep. 5, 1989

[54] DRIVE CONTROL FOR DC ELECTRIC MOTOR

[75] Inventor: Hiroyuki Kawaguchi, Kawasaki, Japan

[73] Assignee: Duplo Seizo Kabushiki Kaisa, Tokyo, Japan

[21] Appl. No.: 190,535

[22] Filed: May 5, 1988

[30] Foreign Application Priority Data

Jun. 25, 1987 [JP] Japan ................ 62-158254

[51] Int. Cl.$^4$ .................................. G05G 5/00
[52] U.S. Cl. ................... 318/626; 318/467; 318/254; 318/373
[58] Field of Search ............ 318/626, 467, 254, 373

[56] References Cited

U.S. PATENT DOCUMENTS

| | | | |
|---|---|---|---|
| 4,162,435 | 7/1979 | Wright | 318/138 |
| 4,184,107 | 1/1980 | Turini et al. | 318/467 |
| 4,629,949 | 12/1986 | Senno | 318/257 |
| 4,633,154 | 12/1986 | Maeda | 318/373 |

Primary Examiner—William M. Shoop, Jr.
Assistant Examiner—Saul M. Bergmann
Attorney, Agent, or Firm—Christensen, O'Connor, Johnson & Kindness

[57] ABSTRACT

A motor drive control that permits a DC electric motor to be rapidly driven and accurately stopped at predetermined stop positions is disclosed. An indexer (V) generates a deceleration point signal at a deceleration point that occurs before a predetermined stop point of load (VI) and a stop point signal at the stop point corresponding to a predetermined destination of the load (VI). A rotational direction detector (III) detects the rotational direction of the motor (IV) as the motor (IV) passes the stop point and produces a rotational direction signal representing the rotational direction of the motor (IV). A rotation control circuit (I) generates a drive signal in response to movement and movement direction signals; a deceleration direction signal in response to the deceleration point signal; an inhibit signal in response to the stop point signal; and a decelerated drive signal representing a reverse rotational direction of the motor (IV). A motor drive circuit (II) produces a drive current having a different amplitude and direction relative to the movement direction signal and the drive signal. The motor drive circuit (II) stops producing the drive current in response to the inhibit signal.

5 Claims, 3 Drawing Sheets

DRIVE CONTROL FOR DC ELECTRIC MOTOR

TECHNICAL AREA

The present invention relates to a drive control for a DC electric motor to initiate the rotation of the DC electric motor and to stop it accurately after a predetermined movement of its load.

BACKGROUND OF THE INVENTION

It is well known in the art that an electric motor and a motor drive for the motor can be utilized to move a guide means used for a sorter or other similar device. Although an electric motor, such as a stepper motor, whose rotation can be accurately controlled, is available, such a motor not only has relatively low torque, but is also costly. In contrast, a DC electric motor is less costly and superior in its starting characteristic. In view of this fact, there has always been a serious demand for use of the DC electric motor to achieve the abovementioned purpose.

SUMMARY OF THE INVENTION

Rapidity and stop position accuracy are required for driving a guide means for a sorter or other similar device. In general, a moment of inertia experienced by a motor shaft when attempting to move a load is expressed as a sum of a moment of inertia of the motor itself, a moment of inertia of a rotatable load and a moment of inertia of a linearly movable load (e.g., the guide means for the sorter or other similar device). When, by conventional control methods, the DC electric motor is rapidly started and rapidly braked at a predetermined stopping point, the moments of inertia cause the motor to be stopped only after the linearly movable load has traveled beyond the stopping point by a considerable amount.

A principal object of the present invention is to provide a drive control for a DC electric motor that starts the DC electric motor in such a manner that the load is rapidly and accurately brought to its destination.

DETAILED DESCRIPTION OF THE PREFERRED EMBODIMENT

Figure 1:
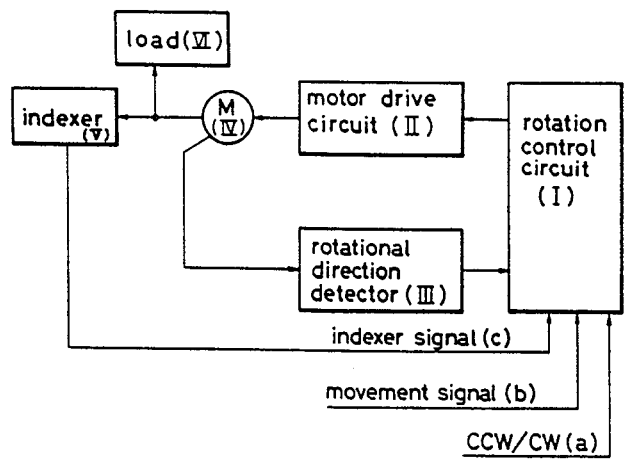
FIG. 1 is a block diagram illustrating a basic arrangement of a DC electric motor drive control formed in accordance with the present invention.

FIG. 1 shows a simplified block diagram of a drive control for a DC electric motor formed in accordance with the present invention. The drive control drives the DC electric motor IV so that a load VI is stopped at a predetermined stop position. An indexer V senses the rotation of the motor IV and generates: a deceleration point signal when the load VI, that is moved by the motor IV, reaches a deceleration point; and, a stop point signal at a stop point corresponding to a destination of the load VI. A rotational direction detector III senses a counter electromotive force generated by the motor IV when it reaches the stop point and detects the rotational direction of the motor IV as the motor passes the stop point. The rotational direction detector III stores the value of the counter electromotive force and produces a rotational direction signal indicating the actual rotational direction of the motor IV.

A movement signal, b, indicating the starting of the motor IV; a movement direction signal, a, indicating the rotational direction of the motor IV; and, an indexer signal, c, from the indexer V are applied to a rotation control circuit I. The rotation control circuit I generates: a drive signal in response to the movement and movement direction signals, b and a, respectively; a deceleration direction signal in response to the deceleration point signal; an inhibit signal upon generation of the stop point signal; and a decelerated drive signal representing a reverse rotational direction of the motor IV with respect to the rotational direction of the motor IV when the rotational direction signal is generated upon completion of the inhibit signal.

A motor drive circuit II supplies a drive current having a different amplitude and direction relative to the movement direction signal, a, and the drive signal from the rotation control circuit I. The motor drive circuit II stops the supply of the drive current in response to the inhibit signal.

Figure 2:
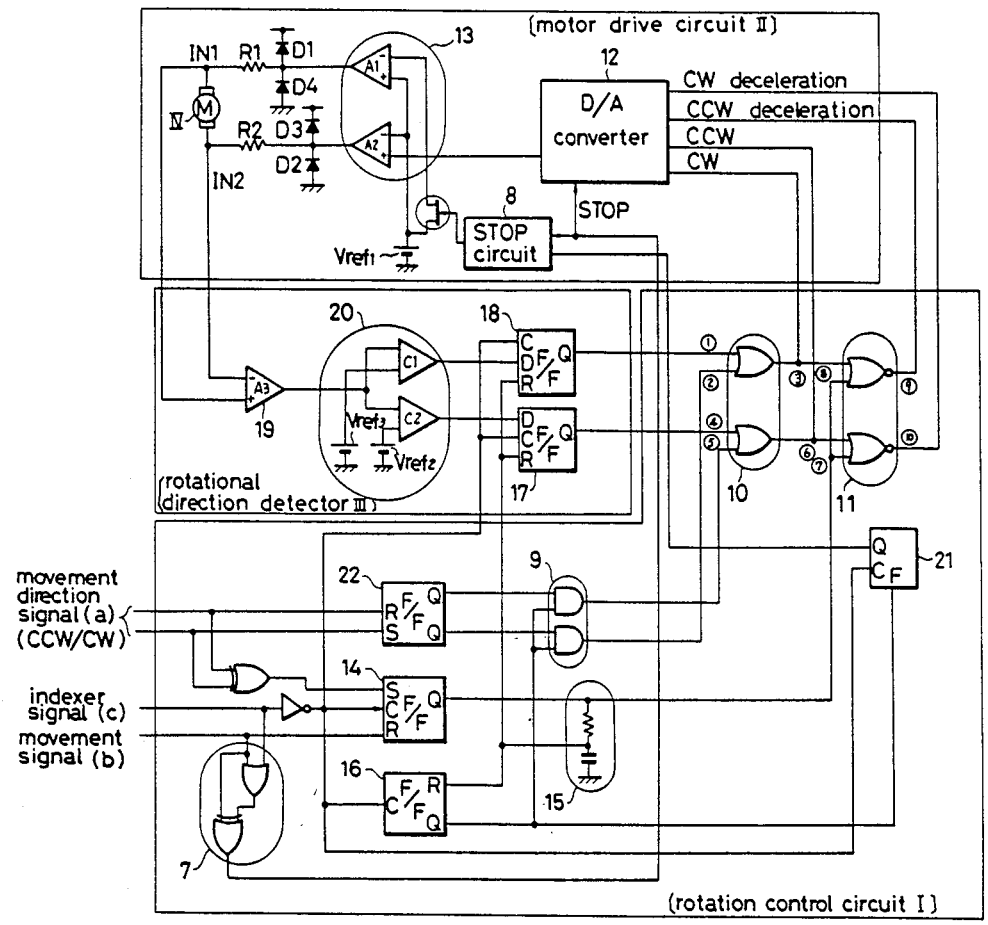
FIG. 2 is a circuit diagram illustrating a preferred embodiment of the DC motor drive control illustrated in FIG. 1.

The present invention will be described in more detail, by way of an example, with reference with the accompanying drawings. As discussed above, FIG. 1 is a simplified block diagram of a DC electric motor drive control formed in accordance with the present invention. FIG. 2 is a schematic diagram showing a preferred embodiment of portions of the drive control illustrated in FIG. 1.

The motor drive circuit II drives the DC electric motor IV which, in turn, drives the load VI (i.e., the sorter or other similar device). An indexer V senses the rotation of the motor IV and generates the deceleration point signal at the deceleration point that lies along a course of travel of the load VI. Additionally, the indexer V generates the stop point signal at the destination stop point of the load VI.

Figure 3:
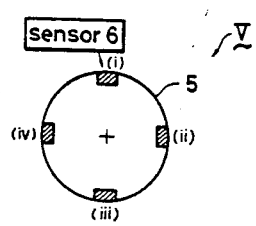
FIG. 3 is a diagram illustrating an idexer, including an indexing disc and a sensor for detecting movement of the guide means or other similar device.

The indexer V, as shown in FIG. 1 and FIG. 3, is coupled to a shaft driven by an output shaft of the DC electric motor IV. The indexer V comprises an indexing disc 5 having signal generation positions (i), (ii), (iii), (iv), and a sensor 6 that detects the deceleration and stop points generated by the disc 5. In FIG. 3, (i) designates the stop point (or the movement start point), (ii) designates the deceleration point, (iii) designates the stop point and, (iv) designates the deceleration point.

In accordance with the preferred embodiment of the invention, the motor IV is controlled so that the motor IV is started at the stop point (i) and begins to move the load VI toward the deceleration point (ii). Upon reaching the deceleration point (ii), the motor has its rotational speed decelerated so that the load VI (i.e., the guide means) is stopped at the stop point (iii). The above operation is successively repeated. It should be noted that another course of movement [i.e., (i)→(ii)→(iii)] is also possible depending on the direction of movement.

The load VI (i.e., the guide means for the sorter) is supported so that it may be moved from one destination (the movement start point) in a first or a second direction to another destination and stopped. A clockwise rotation (hereinafter referred to as CW) of the DC electric motor IV moves the load VI in the first direction while a counterclockwise rotation (hereafter referred to as CCW) moves the load VI in the second direction. As will be discussed later, it is possible that the rotational direction of the DC electric motor IV will be reversed during the above operation. The actual rotational direction of the DC electric motor IV is detected by the rotational direction detector III.

The rotation control circuit I supplies the motor drive circuit II with the motor drive signal. The rotation control circuit I has a movement direction memory flip-flop (FF) 22 that stores the movement direction signal, a. Signal a is supplied from a sequencer or other similar device (not shown), and may be either a CW or CCW signal. The CW signal (which causes the load VI to move in the first direction) is applied to an S-terminal of FF 22 and the CCW signal (which causes the load VI to move in the second direction) is applied to an R-terminal of the FF 22.

A deceleration point memory FF 14 stores the deceleration point signal supplied from the indexer V. The movement direction signal, a, is applied through an EXOR circuit to an S-terminal of FF 14, the indexer signal, c, is applied through an inverter to a C-terminal of FF 14, and the movement signal, b, is applied to an R-terminal of FF 14. The deceleration point memory FF 14 is reset at the start of rotation by the movement signal, b, that is applied to the R-terminal. Thus, when the indexer signal, c, corresponding to point (i), is initially generated, it will not be erroneously stored as corresponding to the deceleration point (ii).

A stop point memory FF 16 stores the indexer signal, c, as the stop point signal (iii). The indexer signal, c, is applied through the inverter to a C-terminal of FF 16. An output from a Q-terminal of the deceleration point memory FF 14 is coupled, through an integrator 15, to an R-terminal of the FF 16.

The indexer signal, c, and the movement signal, b, are applied to a movement signal preference circuit 7 which comprises an OR circuit and an EXOR circuit. When the movement signal, b, from the sequencer, is applied to the movement signal preference circuit 7, the preference circuit 7 gives priority to the movement signal, b. The priority function of circuit 7 prevents the indexer signal, c, that appears at the stop point (i) from being input to a stop circuit 8 and a D/A converter 12, both of which are included in the motor drive circuit II. Consequently, the stop circuit 8 and the D/A converter 12 of the motor drive circuit II are released from their stop conditions by a leading edge of the movement signal, b.

To assure that the motor IV can continue to be rotated even after the movement signal, b, has been turned off, the movement signal, b, must continue to be supplied until the stop point (i) is passed. Accordingly, the width of the movement signal, b, is determined as follows:

$$t_1 < t_2 < t_3$$

where,
$t_1$ = the indexer signal, c, pulse width;
$t_2$ = the movement signal, b, pulse width; and,
$t_3$ = the indexer pulse interval (a time required to move from the stop point (i) to the deceleration point (ii)).

An AND circuit 9, an OR circuit 10 and a NOR circuit 11 supply the motor drive circuit II with signals indicating: the rotational direction (CW, CCW); and, the drive mode or the decelerated drive mode. The values of the signals are dependent upon: the output signals of the rotational direction detector III, which will be described below; and the logic outputs of the movement direction memory FF 22, the deceleration point memory FF 14 and the stop point memory FF 16.

A limiter 21 is a counter that applies a stop signal to the stop circuit 8 of the motor drive circuit II when the number of pulses representing a stop point (i) exceeds a predetermined number. The deceleration point signal and the stop point signal are also applied through the movement signal preference circuit 7 to the stop circuit 8.

The OR circuit 10 and the NOR circuit 11 of the rotation control circuit I supply signals indicating the rotational direction and the speed of the motor IV to the D/A converter 12 of the motor drive circuit II. Input terminals CW, CCW, CW deceleration, and CCW deceleration of the D/A converter 12 have their logical input conditions related to one another as follows: the CCW terminal is low when the CW terminal is high and the CCW terminal is high when the CW terminal is low; and, the CCW deceleration terminal is high when the CW deceleration terminal is low and the CCW deceleration terminal is low when the CW deceleration terminal is high. The output of the D/A converter 12 provides: the CW high speed drive signal when the CW input is high and the CW deceleration input is high; the CW decelerated drive signal when the CW input is high and the CW deceleration input is low; the CCW high speed drive signal when the CCW input is high and the CCW deceleration input is high; and the CCW decelerated drive signal when the CCW input is high and the CCW deceleration input is low.

The analog voltage output from the D/A converter 12 is applied to a differential amplifier 13 which, in turn, amplifies the analog voltage to a desired level. A reference voltage, $Vref_1$, is applied to the differential amplifier 13. Output voltages from operational amplifiers $A_1$ and $A_2$ of the differential amplifier 13 are related as follows: the output of the operational amplifier $A_2$ is negative when the output of the operational amplifier $A_1$ is positive; and, the output of the operational amplifier $A_2$ is positive when the output of the operational amplifier $A_1$ is negative. Output current from the operational amplifier $A_1$ flows through: a resistor $R_1$; the DC motor IV; a resistor $R_2$; and, the operational amplifier $A_2$. Output current from the operational amplifier $A_2$ flows through: the resistor $R_2$; the DC motor IV; the resistor $R_1$; and, the operational amplifier $A_1$.

Rotation of the DC motor IV causes a movement of the guide means and a rotation of the indexer V. Voltages, $IN_1$ and $IN_2$, at opposite ends of the DC motor IV, are related to each other as follows:

$$IN_1 \leq Vref_1 \leq IB_2; \text{ or,}$$

$$IN_1 \geq Vref_1 \geq IN_2,$$

where $Vref_1$ is a voltage which causes the DC motor IV to be turned off. The rotational direction detector III detects the rotational direction of the motor IV at a point in time when the motor IV is de-energized by the stop point signal. A Q output from the stop point memory FF 16, of the rotation control circuit I, is transmitted to the AND circuit 9, thereby inhibiting the movement direction signal, a, from the movement direction memory FF 22.

As the load VI travels from the deceleration point (ii) to the stop point (iii), both the D/A converter 12 and the differential amplifier 13 are turned off, resulting in a counter electromotive current generated by the motor IV that flows from $IN_1$ through: the resistor $R_1$; a diode $D_1$; a diode $D_2$; and the resistor $R_2$ to $IN_2$. In the case of the load traveling from the deceleration point (iv) to the stop point (iii), the counter electromotive current flows from $IN_2$ through: the resistor $R_2$; a diode $D_3$; a diode $D_4$; and the resistor $R_1$ to $IN_1$. Consequently, voltage drops across the resistor $R_1$ and the resistor $R_2$ are related to the current direction (and, therefore, the rotational direction of the motor IV).

Figure 5:
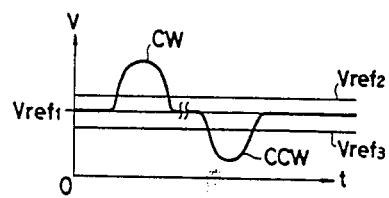

The voltage across the resistor $R_1$ or the resistor $R_2$ is input to, and amplified by, the differential amplifier 19 of the rotational direction detector III. The output voltage of the differential amplifier 19 is positive, with respect to the off point $Vref_1$, when the output voltage is caused by the CW direction of the motor IV, and negative, with respect to the off point, $Vref_1$, when the output voltage is caused by the CCW direction of the motor IV (FIG. 5).

The output voltage from amplifier 19 is transmitted to a comparator 20 that compares the output voltage with reference voltages, $Vref_2$ and $Vref_3$. In this manner, the analog voltage output from the differential amplifier 19 is converted into a digital signal indicating the CW or CCW rotational direction. The reference voltages, $Vref_2$ and $Vref_3$, are selected so that they are related to the off voltage, $Vref_1$, in the following manner: $Vref_2 < Vref_1 < Vref_3$. The relationship between $C_1$ and $C_2$ of the comparator 20 is such that; $C_2$ is low when $C_1$ is high, and $C_2$ is high when $C_1$ is low.

The output signal from the comparator 20 is applied to data terminals (D) of the CW memory FF 17 and the CCW memory FF 18 so that the rotational direction of the motor IV is stored when the trailing edge of the stop signal of the indexer signal, c, is received. The rotational direction signal outputs from the CW memory FF 17 and the CCW memory FF 18 of the rotational direction detector III are transmitted to the OR circuit 10 of the rotation control circuit I. The direction signal output from the CW memory FF 17 is coupled to the CCW terminal of the D/A converter 12, while the CCW direction signal output from the CCW memory 18 is coupled to the CW terminal of the D/A converter 12. As an example, when the CW signal is output from the CW memory FF 17, this CW signal is input to the CCW terminal of the D/A converter 12 which, in turn, outputs the CCW voltage. Consequently, the CCW signal amplified by the amplifier 13 causes the motor IV to be rotated in the CCW direction. Accordingly, when the load has passed the stop point (iii), the rotation of the motor IV is controlled so as to drive the load VI back to the stop point (iii). Thus, the rotation of the motor IV is stopped at the stop point (iii). If the load VI has not traveled beyond the stop point (iii), a predetermined control condition has been satisfied and the motor IV is necessarily stopped and awaits the next movement signal.

Figure 4:
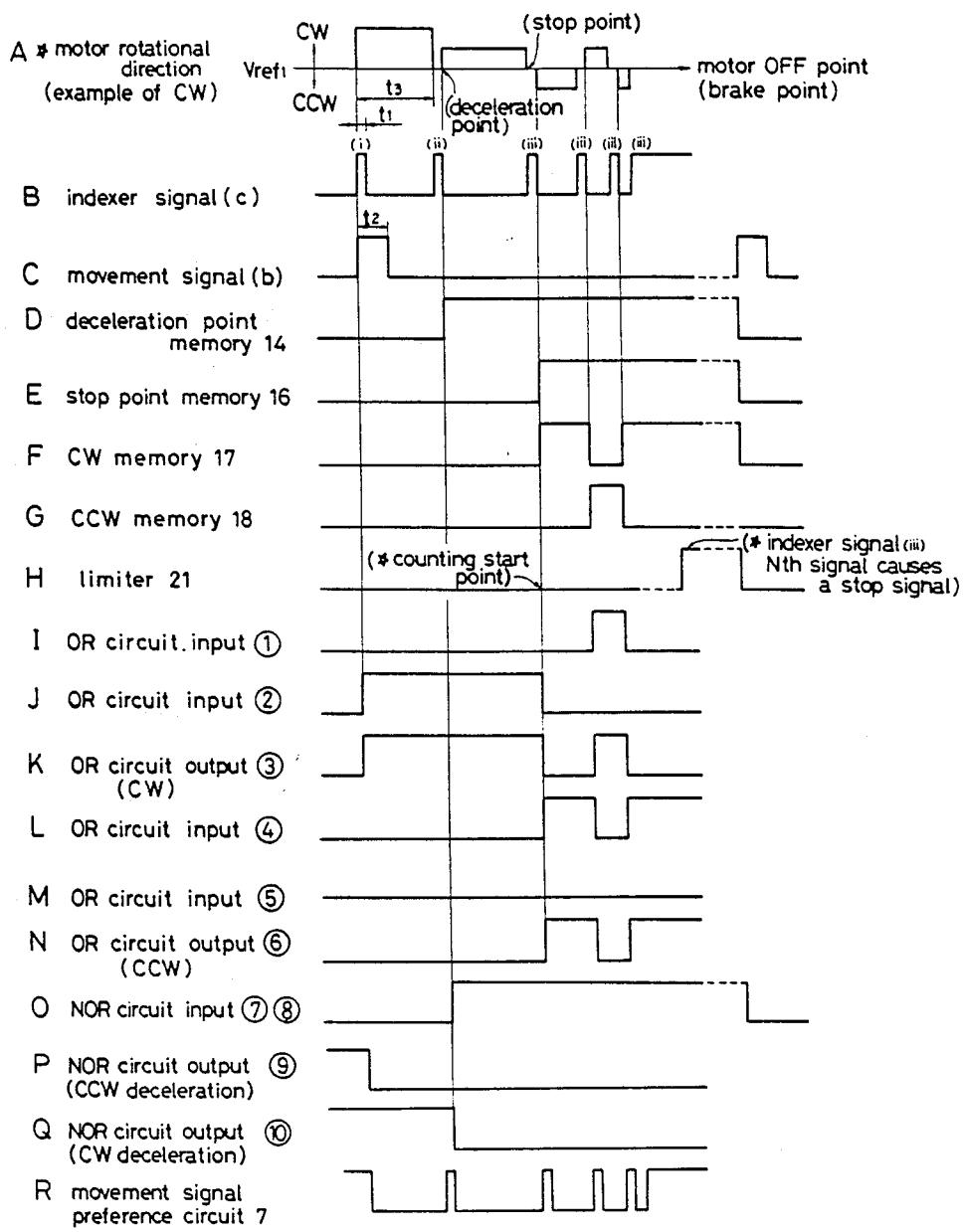
FIG. 4, lines A-R, is a series of waveforms of signals at various points in the circuit diagram illustrated in FIG. 2, illustrating the operation of the DC motor drive control formed in accordance with the present invention; and, FIG. 5 is a diagram illustrating a counter electromotive current generated by the DC motor after the current has been amplified by a differential amplifier.

The preferred embodiment of the invention operates in a manner that will be described below with reference to FIG. 4. FIG. 4 is a time chart that illustrates the waveforms of various inputs and outputs when the motor IV is driven in the clockwise direction. It is assumed that the movement signal, a, (not shown) indicating movement in the CW direction, and that the movement signal, b, as shown on line C in FIG. 4, is applied to the rotation control circuit I. The latter signal causes the output of the movement signal preference circuit 7 to be low, as shown on line R in FIG. 4, and thus, the motor drive circuit II is released from its stop condition. At this point in time, the CW and CW deceleration inputs, as indicated on lines K and Q in FIG. 4, respectively, are applied to the D/A converter 12 of the motor drive circuit II so that the motor IV is driven in the clockwise direction at full speed during the $t_3$ period, as indicated on line A in FIG. 4.

The CW rotation causes the load VI to travel in the first direction and the indexer V to be rotated so as to generate the deceleration point signal, as indicated on line B (ii) in FIG. 4, which is input to the rotation control circuit I. The deceleration point signal is, as indicated on line R in FIG. 4, transmitted via the movement signal preference circuit 7 to the stop circuit 8, thereby turning the D/A converter 12 and the differential amplifier 13 off. The voltages on the terminals $IN_1$ and $IN_2$ are related such that: $IN_1 = IN_2 = Vref_1$. Thus, the voltage across the terminals $IN_1$ and $IN_2$ is zero and, as a result, a counter electromotive current is generated by the DC motor IV. This current flows from the terminal, $IN_1$, through: the resistor, $R_1$; the diode, $D_1$; the diode $D_2$; and, the resistor, $R_2$; to the terminal, $IN_2$, causing a braking effect that attempts to stop the DC motor IV. However, because the motor's inertial force exceeds the braking force, the braking effect produces a rapid deceleration of the motor IV from the point (i) to the point (ii) rather than stopping the DC motor IV at the deceleration point (ii).

At the trailing edge of the deceleration point pulse, the output of the deceleration memory FF 14 goes high, as illustrated on line D in FIG. 4; the input terminals 7 and 8 of the NOR circuit 11 go high, as indicated on line 0 in FIG. 4; the output terminal 9 of the NOR circuit 11 is low; and, the CW deceleration input of the D/A converter 12 in the motor drive circuit II goes low, as indicated on line Q in FIG. 4. Thus, the motor IV is driven in the clockwise direction in the decelerated drive fashion, as indicated on line A in FIG. 4.

Upon generation of the stop point pulse, i.e., when the indexer V has passed the deceleration point (ii) and reaches the stop point (iii), the counter electromotive current is generated by the motor IV, thereby providing a braking effect. If the motor IV is stopped during this process, the stop point signal pulse (iii) will not fall. Accordingly, the stop circuit 8 of the motor drive circuit II maintains the differential amplifier 13 at its stopped condition so as to complete the control of the load VI.

If the load VI goes beyond the stop point (iii) due to the inertia of the motor IV, the stop point memory FF 16 will store the running past condition in preparation for the subsequent operation by going high when the trailing edge of the stop point signal (of the indexer signal, c) is input to the stop point memory FF 16. The low output of the stop point memory FF 16 is transmitted to the AND circuit 9, thereby inhibiting the movement direction signal, a, from the movement direction memory FF 22.

At the stop point (iii), both the D/A converter 12 and the differential amplifier 13 are turned off and the counter electromotive current produced by the motor IV flows from the terminal, $IN_1$, through: the resistor, $R_1$; the diode, $D_1$; the diode, $D_2$; and the resistor $R_2$; to the terminal, $IN_2$. Thus, voltage drops across the resistor, $R_1$ and the resistor, $R_2$ are related to the current direction (i.e., the rotational direction). The voltage across the resistor, $R_1$ or $R_2$, is input to, and differentially amplified by, the differential amplifier 19 of the rotational direction detector III. The output voltage of the differential amplifier 19 is positive with respect to the off level, $Vref_1$, if the output voltage is caused by the CW direction of the motor IV and is negative with respect to the off level $Vref_1$, if the output voltage is caused by the CCW direction of the motor IV (FIG. 5). The output voltage signal from amplifier 19 is transmitted to the comparator 20 and compared with the reference voltages, $Vref_2$ and $Vref_3$. Thus, the analog voltage output from the differential amplifier 19 is converted into the digital signal indicating the CW rotational direction of the motor IV.

The comparator 20 compares the off voltage, $Vref_1$, of the DC motor IV, with $Vref_2$ and $Vref_3$, and produces an output signal that is applied to the data terminals (D) of the CW memory FF 17 and the CCW memory FF 18. At the same point in time that the trailing edge of the stop signal (the indexer signal, c) occurs, the output of the CW memory FF 17 goes high the output of the CCW memory FF 18 is low, and the rotational direction of the motor IV is stored. The rotational direction signals from the CW memory FF 17 and the CCW memory FF 18 are transmitted to the OR circuit 10. The CW direction signal at the output terminal (6) of the OR circuit 10 is applied to the CCW terminal of the D/a converter 12. At this point in time, the CCW deceleration terminal is low, as indicated on line Q in FIG. 4, and the CCW decelerated drive current is supplied to the motor IV, as indicated on line A in FIG. 4. The rotation of the motor IV is controlled so that, when the load VI has passed beyond the stop point (iii), the load is brought back to the stop point (iii). In this manner, the rotation of the motor IV is finally stopped at the stop point (iii).

In this embodiment of the invention, the limiter 21 comprises a counter. The motor drive circuit II is disabled by stop circuit 8 after N attempts to stop the motor IV at the stop point (iii).

Although the preferred embodiment of the present invention has been described in detail, various modifications are possible within the scope of the invention. For example, it is possible to progressively reduce the reverse drive current after going past the stop point in an analog fashion, and thereby achieve a smooth stop. As will be apparent from the foregoing description, the motor drive control constructed in accordance with the present invention enables a relatively low cost DC electric motor to be rapidly driven and accurately stopped at predetermined stop positions. The rotational direction of the motor in the vicinity of the respective stop points can be detected using the counter electromotive current generated by the motor, so that the synchronizing means may be simplified and no other sensor means are necessary.

The embodiments of the invention in which an exclusive property of privilege is claimed are defined as follows:

1. A drive control for a DC electric motor comprising:
   (a) indexing means coupled to a shaft of a motor for producing a first indexing signal associated with a first position of said shaft and a second indexing signal associated with a second position of said shaft;
   (b) a rotational direction detector coupled to said motor for determining actual motor rotation by detecting a counterelectromotive force generated by said motor when said shaft is in said second position, said rotational direction detector producing a first rotational direction signal related to a first rotational direction of said motor and a second rotational direction signal related to a second rotational direction of said motor;
   (c) rotation control means for controlling the rotation of said motor, said rotation control means receiving said first and second indexing signals from said indexing means and said first and second rotational direction signals from said rotational direction detector and producing a plurality of rotation control signals; and,
   (d) motor drive means for driving said motor, said motor drive means receiving said plurality of rotation control signals from said rotation control means and producing a drive control signal for driving said motor.

2. The drive control claimed in claim 1, wherein said first indexing signal is a deceleration point signal and said second indexing signal is a stop point signal, said indexing means producing said deceleration point signal at a deceleration point and said stop point signal at a stop point, said deceleration point being said first position of said shaft and said stop point being said second position of said shaft.

3. The drive control claimed in claim 2, wherein said rotation control means is a rotation control circuit, said rotation control circuit further receiving signals from one or more sensors, said sensor signals including:
   (a) a movement signal indicating movement of said motor; and,
   (b) a movement direction signal indicating a rotational direction of said motor.

4. The drive control claimed in claim 3, wherein said plurality of rotation control signals produced by said rotation control circuit comprise:
   (a) a drive signal in response to said movement and movement direction signals, said drive signal causing said motor to move in said first or said second rotational direction;
   (b) a first decelerated drive signal in response to said deceleration point signal, said first decelerated drive signal causing said motor to decelerate in said first rotational direction if said motor is moving in said first rotational direction, and to decelerate in said second rotational direction if said motor is moving in said second rotational direction;
   (c) an inhibit signal in response to said stop point signal; and,
   (d) a second decelerated drive signal of a reverse direction with respect to said first or second rotational direction of said motor when said first or second rotational direction signal is generated upon completion of said inhibit signal.

5. The drive control claimed in claim 4, wherein said drive control signal from said motor drive means is a drive current having a different amplitude and direction relative to said movement direction signal from said one or more sensors and said drive signal from said rotation control circuit; and, wherein said motor drive means stops producing said drive current in response to said inhibit signal.

* * * * *

UNITED STATES PATENT AND TRADEMARK OFFICE
CERTIFICATE OF CORRECTION

PATENT NO. : 4,864,211

DATED : September 5, 1989

INVENTOR(S) : Hiroyuki Kawaguchi

It is certified that error appears in the above-identified patent and that said Letters Patent is hereby corrected as shown below:

Column 1, line 20, "abovemen-tioned" should be --above-mentioned--

Column 1, line 50, "idexer" should be --indexer--

Column 4, line 9, "wh ich" should be --which--

Column 4, line 62, "$IB_2$" should be --$IN_2$--

Column 6, line 43, "0" (numeral) should be --O--

Column 7, line 35, "D/a" should be --D/A--

Signed and Sealed this

Fourth Day of September, 1990

*Attest:*

HARRY F. MANBECK, JR.

*Attesting Officer*     *Commissioner of Patents and Trademarks*